(12) United States Patent
Suzuki

(10) Patent No.: US 9,385,648 B2
(45) Date of Patent: Jul. 5, 2016

(54) ELECTRIC POWER STEERING APPARATUS

(75) Inventor: Hiroshi Suzuki, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 402 days.

(21) Appl. No.: 13/877,464

(22) PCT Filed: Sep. 29, 2011

(86) PCT No.: PCT/IB2011/002281
§ 371 (c)(1),
(2), (4) Date: Apr. 26, 2013

(87) PCT Pub. No.: WO2012/046115
PCT Pub. Date: Apr. 12, 2012

(65) Prior Publication Data
US 2013/0241452 A1 Sep. 19, 2013

(30) Foreign Application Priority Data

Oct. 4, 2010 (JP) ................................ 2010-224893
Oct. 21, 2010 (JP) ................................ 2010-236406

(51) Int. Cl.
*H02P 31/00* (2006.01)
*H02P 6/00* (2006.01)
*B62D 5/04* (2006.01)
(Continued)

(52) U.S. Cl.
CPC .............. *H02P 31/00* (2013.01); *B62D 5/0403* (2013.01); *B62D 5/046* (2013.01); *B62D 5/0463* (2013.01); *H02P 21/06* (2013.01); *H02P 25/22* (2013.01)

(58) Field of Classification Search
USPC .................................................. 318/400.05
See application file for complete search history.

(56) References Cited

U.S. PATENT DOCUMENTS

| 6,281,656 B1 * | 8/2001 | Masaki | B60L 11/14 318/700 |
| 9,007,004 B2 * | 4/2015 | Hunter | H02P 21/0003 318/400.02 |
| 2006/0219470 A1 * | 10/2006 | Imagawa | B62D 5/0403 180/446 |

(Continued)

FOREIGN PATENT DOCUMENTS

EP 1 426 266 A2 6/2004
JP A-04-325893 11/1992

(Continued)

OTHER PUBLICATIONS

International Search Report issued in International Patent Application No. PCT/IB2011/002281 dated Feb. 21, 2012.

(Continued)

*Primary Examiner* — Eduardo Colon Santana
*Assistant Examiner* — Said Bouziane
(74) *Attorney, Agent, or Firm* — Oliff PLC

(57) ABSTRACT

Motor control command output means outputs, as a motor control command, a second command value, which is calculated by second command value calculating means on the basis of a first command value generated by first command value calculating means and a current value obtained by causing motor driving system current adding means to add together currents of respective motor driving systems, to the motor driving systems of two systems constituted by a motor and drive circuits for driving the motor. The second command value calculating means may calculate the second command value by performing a d/q coordinate system current feedback calculation using the current value.

7 Claims, 7 Drawing Sheets

(51) Int. Cl.
*H02P 21/06* (2016.01)
*H02P 25/22* (2006.01)

(56) References Cited

U.S. PATENT DOCUMENTS

| 2010/0072738 | A1* | 3/2010 | Szabela ............... | B62D 5/04 280/771 |
| 2011/0238245 | A1* | 9/2011 | Gallegos-Lopez ...... | B60L 11/14 701/22 |

FOREIGN PATENT DOCUMENTS

| JP | A-07-033342 | 2/1995 |
| JP | A-2000-041392 | 2/2000 |
| JP | 2001086794 A * | 3/2001 |
| JP | A-2001-086794 | 3/2001 |
| JP | A-2004-10024 | 1/2004 |
| JP | A-2006-273153 | 10/2006 |

OTHER PUBLICATIONS

Written Opinion of the International Searching Authority issued in International Patent Application No. PCT/IB2011/002281 dated Feb. 21, 2012.

Jun. 5, 2014 Japanese Office Action issued in Japanese Application No. 2010-236406 (with translation).

Office Action issued in Japanese Patent Application No. 2010-224893 dated Mar. 3, 2014 (with partial translation).

* cited by examiner

ELECTRIC POWER STEERING APPARATUS

BACKGROUND OF THE INVENTION

1. Field of the Invention

The invention relates to an electric power steering apparatus.

2. Description of Related Art

Japanese Patent Application Publication No. 2004-10024 (JP-A-2004-10024) describes an electric power steering apparatus (EPS) that modifies steering angles of steered wheels by driving two motors to rotate. The EPS described in JP-A-2004-10024 controls a first motor and a second motor independently using a first drive circuit and a first control device, and a second drive circuit and a second control device, respectively. In other words, the steering angles of the steered wheels are modified by controlling the motors of two systems independently.

In the EPS described in JP-A-2004-10024, however, although the respective motors, drive circuits, and control devices of the two systems are controlled independently, the two motors must be driven using appropriate synchronization control in order to modify the steering angles of the steered wheels. To perform this synchronization control, the motors must be controlled while monitoring control timings and operating conditions of the first control device and second control device. When both control devices are monitored, a calculation load of one of the first control device and the second control device increases. When the calculation load increases, appropriate synchronization control for the vehicle condition cannot be performed, and therefore a tracking delay may occur, leading to a reduction in steering responsiveness.

SUMMARY OF THE INVENTION

The invention provides an electric power steering apparatus that is capable of lightening a calculation load of a control device for performing synchronization control on a two-system motor, and that exhibits a high degree of steering responsiveness.

A first aspect of the invention relates to an electric power steering apparatus including a motor that applies a steering assist force to a steering mechanism, and a plurality of motor driving systems constituted by drive circuits for driving the motor. The electric power steering apparatus includes: steering torque detecting means for detecting a steering torque; vehicle speed detecting means for detecting a vehicle speed; first command value calculating means for calculating a first command value on the basis of the steering torque and the vehicle speed; current detecting means provided in each of the motor driving systems to detect a current flowing through the motor; motor driving system current adding means for adding together the currents of the respective motor driving systems detected by the current detecting means; second command value calculating means for calculating a second command value on the basis of the first command value and the currents added by the motor driving system current adding means; and command output means for outputting the second command value to the plurality of motor driving systems as a motor control command.

According to the aspect described above, the second command value, which is calculated by the second command value calculating means on the basis of the first command value calculated by the first command value calculating means and the current value obtained by causing the motor driving system current adding means to add together the currents of the respective motor driving systems, is output to the plurality of motor driving systems as the motor control command. Hence, the calculation performed by the second command value calculating means is not complicated, and as a result, a calculation load thereof can be reduced.

A second aspect of the invention relates to an electric power steering apparatus including a motor that applies a steering assist force to a steering mechanism, and a plurality of motor driving systems constituted respectively by drive circuits for driving the motor. The electric power steering apparatus includes: steering torque detecting means for detecting a steering torque; vehicle speed detecting means for detecting a vehicle speed; first command value calculating means for calculating a first command value on the basis of the steering torque and the vehicle speed; current detecting means provided in each of the motor driving systems to detect a current flowing through the motor; second command value calculating means for calculating a second command value by performing a d/q coordinate system current feedback calculation using the current detected by the current detecting means; and a plurality of pulse width modulation (PWM) converting means for outputting the second command value respectively to the plurality of motor drive circuits.

According to the aspect described above, the second command value can be output to the respective motor drive circuits of the two systems through the d/q coordinate system current feedback calculation. As a result, a calculation load of a control device can be lightened, and the two-system electric motor can be subjected to appropriate synchronization control under any travel conditions. Hence, an assist force that provides a favorable steering feeling is obtained.

In the aspect described above, the second command value calculating means may perform the d/q coordinate system current feedback calculation after adding together the currents of the respective motor driving systems detected by the current detecting means.

According to the aspect described above, the second command value can be output to the respective motor drive circuits of the two systems through the d/q coordinate system current feedback calculation by adding together the respective current values of the two systems. As a result, the calculation load of the control device can be lightened by adding together the respective current values of the two systems after subjecting the respective current values to three phase/two phase conversion individually, and therefore the two-system electric motor can be subjected to appropriate synchronization control under any travel conditions. Hence, an assist force that provides a favorable steering feeling is obtained.

In the aspect described above, the electric power steering apparatus may further include rotation angle detecting means for detecting a rotation angle of the motor. The first command value calculating means may calculate the first command value on the basis of the steering torque, the vehicle speed, and the motor rotation angle.

In the aspect described above, the electric power steering apparatus may further include abnormality detecting means for detecting an abnormality in the electric power steering apparatus, and when an abnormality occurs in the electric motor of one of the plurality of motor driving systems or in one of the motor drive circuits, the abnormality detecting means may output the second command value to the PWM converting means of any of the motor driving systems in which the abnormality has not occurred.

According to the aspect described above, when an abnormality occurs in the electric motor in one of the two systems or in one of the motor drive circuits, assistance can be continued by the system in which the abnormality has not occurred. As a result, rapid deterioration of the steering feeling can be prevented.

In the aspect described above, the abnormality detecting means may perform an abnormality detection only when a rotation angular velocity of the motor is equal to or smaller than a predetermined velocity.

According to the aspects described above, it is possible to provide an electric power steering apparatus with which a reduction in a calculation load can be achieved. Further, according to the aspects described above, it is possible to provide an electric power steering apparatus capable of appropriately controlling a two-system motor synchronously such that a favorable steering responsiveness is obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
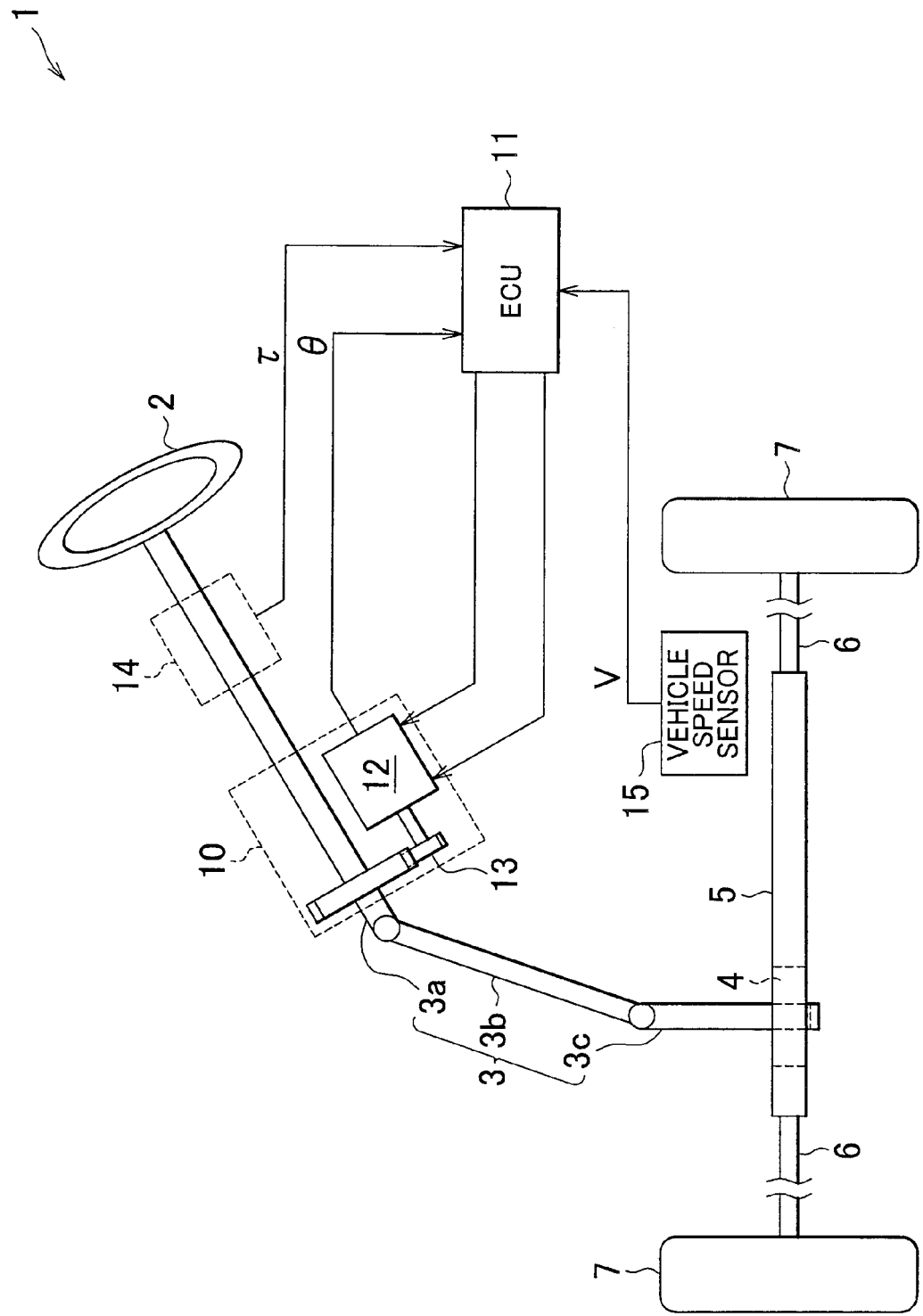
FIG. 1 is a schematic constitutional diagram of an electric power steering apparatus (EPS)

A first embodiment of an electric power steering apparatus (EPS) employing a two-system motor according to the invention will be described below with reference to the drawings. As shown in FIG. 1, in an EPS 1 according to the first embodiment, a steering shaft 3, to which a steering wheel 2 is fixed, is coupled to a rack shaft 5 via a rack and pinion mechanism 4.

Rotation of the steering shaft 3 accompanying a steering operation is converted into a reciprocating linear motion of the rack shaft 5 by the rack and pinion mechanism 4. Note that the steering shaft 3 according to the first embodiment is formed by coupling a column shaft 3a, an intermediate shaft 3b, and a pinion shaft 3c. The reciprocating linear motion of the rack shaft 5 accompanying rotation of the steering shaft 3 is transmitted to a knuckle, not shown in the drawing, via a tie rod 6 coupled to either end of the rack shaft 5, and as a result, a steering angle of a steered wheel 7, or in other words an advancement direction of a vehicle, is modified.

Further, the EPS 1 includes an EPS actuator 10 serving as a steering force assist device that applies an assist force for assisting the steering operation to a steering system, and an electronic control unit (ECU) 11 serving as control means for controlling an operation of the EPS actuator 10.

The EPS actuator 10 according to the first embodiment is constituted by a so-called column assist type EPS actuator in which a motor 12 serving as a drive source is drive-coupled to the column shaft 3a via a speed reducing mechanism 13. The EPS actuator 10 reduces a rotation speed of the motor 12 and transmits the reduced rotation to the column shaft 3a so that a resulting motor torque is applied to the steering system as the assist force.

A torque sensor 14 and a vehicle speed sensor 15 are connected to the ECU 11. The ECU 11 calculates the assist force (a target assist force) to be applied to the steering system on the basis of a steering torque $\tau$ and a vehicle speed V detected from output signals from the respective sensors. The ECU 11 then controls an operation of the EPS actuator 10, or in other words the assist force applied to the steering system, by supplying power to the motor 12 serving as the drive source to cause the EPS actuator 10 to generate the calculated target assist force (power assist control).

Figure 2:
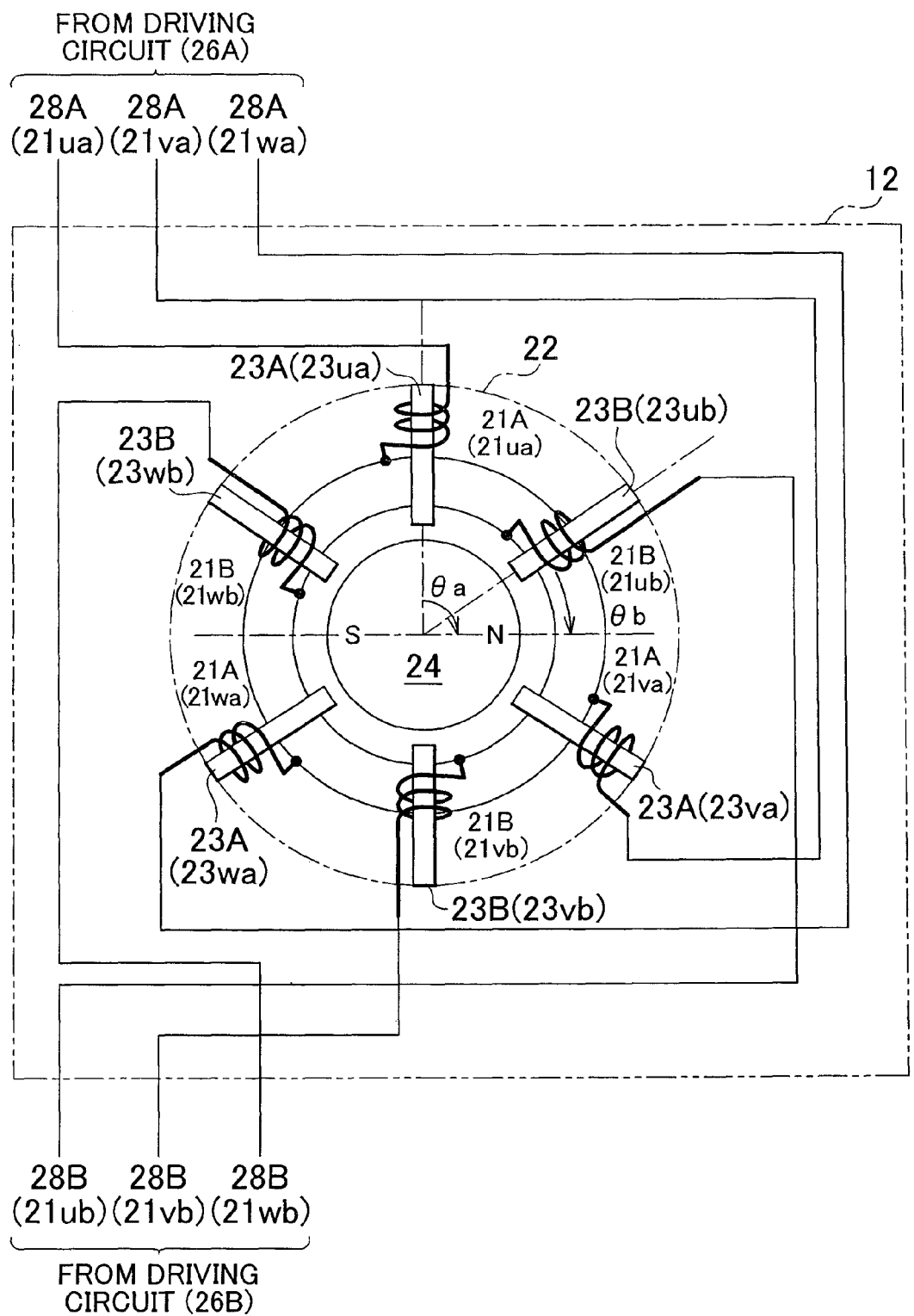
FIG. 2 is a schematic constitutional diagram of a motor according to a first embodiment.

Next, the motor 12 of the EPS actuator 10 used in the EPS 1 according to the first embodiment will be described. As shown in FIG. 2, the motor 12 according to the first embodiment is formed by winding motor coils 21A, 21B of two systems around a single stator 22 at mutually offset phases. More specifically, the motor coil 21A (21$ua$, 21$va$, 21$wa$) of a first system and the motor coil 21B (21$ub$, 21$vb$, 21$wb$) of a second system are respectively wound around teeth 23A (23$ua$, 23$va$, 23$wa$), 23B (23$ub$, 23$vb$, 23$wb$) of the stator 22 in respectively corresponding phases (u, v, w). A rotor 24 supported to be free to rotate is provided on a radial direction inner side of the teeth 23A, 23B.

In other words, the motor coils 21A, 21B of the two systems share the stator 22 and the rotor 24. The rotor 24 rotates on the basis of a magnetomotive force generated by the motor coils 21A, 21B wound around the teeth 23A, 23B in the manner described above. The ECU 11 according to the first embodiment controls a motor torque by supplying drive power independently to each of the motor coils 21A, 21B.

Figure 3:
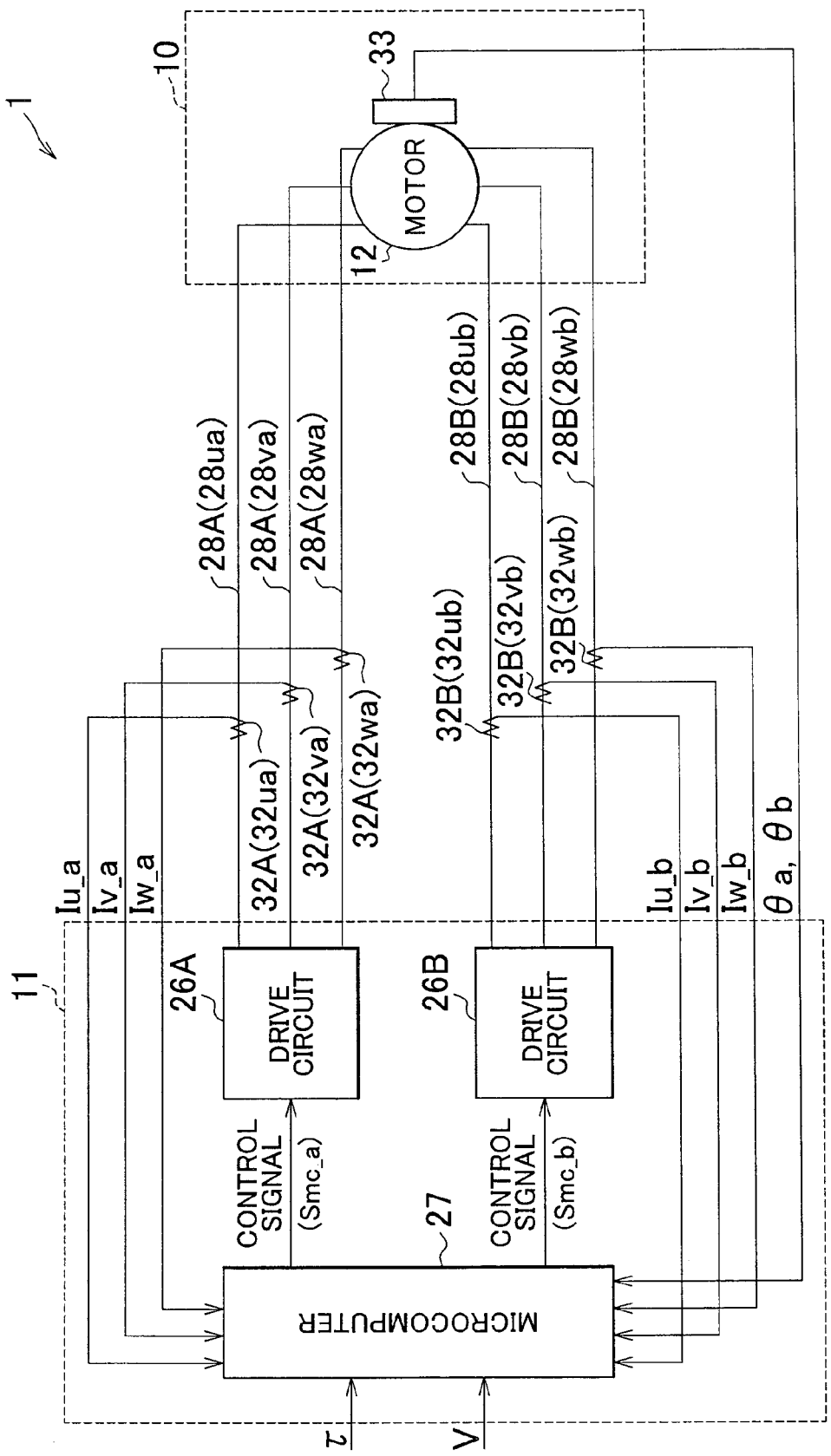
FIG. 3 is a control block diagram of an EPS according to the first embodiment.

As shown in FIG. 3, the ECU 11 according to the first embodiment includes two drive circuits 26A, 26B provided in accordance with the respective motor coils 21A, 21B, and a microcomputer 27 that outputs control signals Smc_a, Smc_b respectively to the drive circuits 26A, 26B.

More specifically, the drive circuit 26A is connected to the motor coil 21A of the first system via a power line 28A (28$ua$, 28$va$, 28$wa$), while the drive circuit 26B is connected to the motor coil 21B of the second system via a power line 28B (28$ub$, 28$vb$, 28$wb$). Further, the control signal Smc_a output by the microcomputer 27 is input into the drive circuit 26A, while the other control signal Smc_b is input into the drive circuit 26B. Note that in the first embodiment, conventional PWM inverters formed by connecting three arms corresponding to the respective phases in parallel, where a switching element pair connected in series is used as a basic unit (an arm), are employed as the drive circuits 26A, 26B. The control signals Smc_a, Smc_b output by the microcomputer 27 define an ON duty ratio of the arm of each phase. The ECU 11 according to the first embodiment supplies drive power output by the drive circuits 26A, 26B to the respectively corresponding motor coils 21A, 21B on the basis of the control signals Smc_a, Smc_b.

Figure 4:
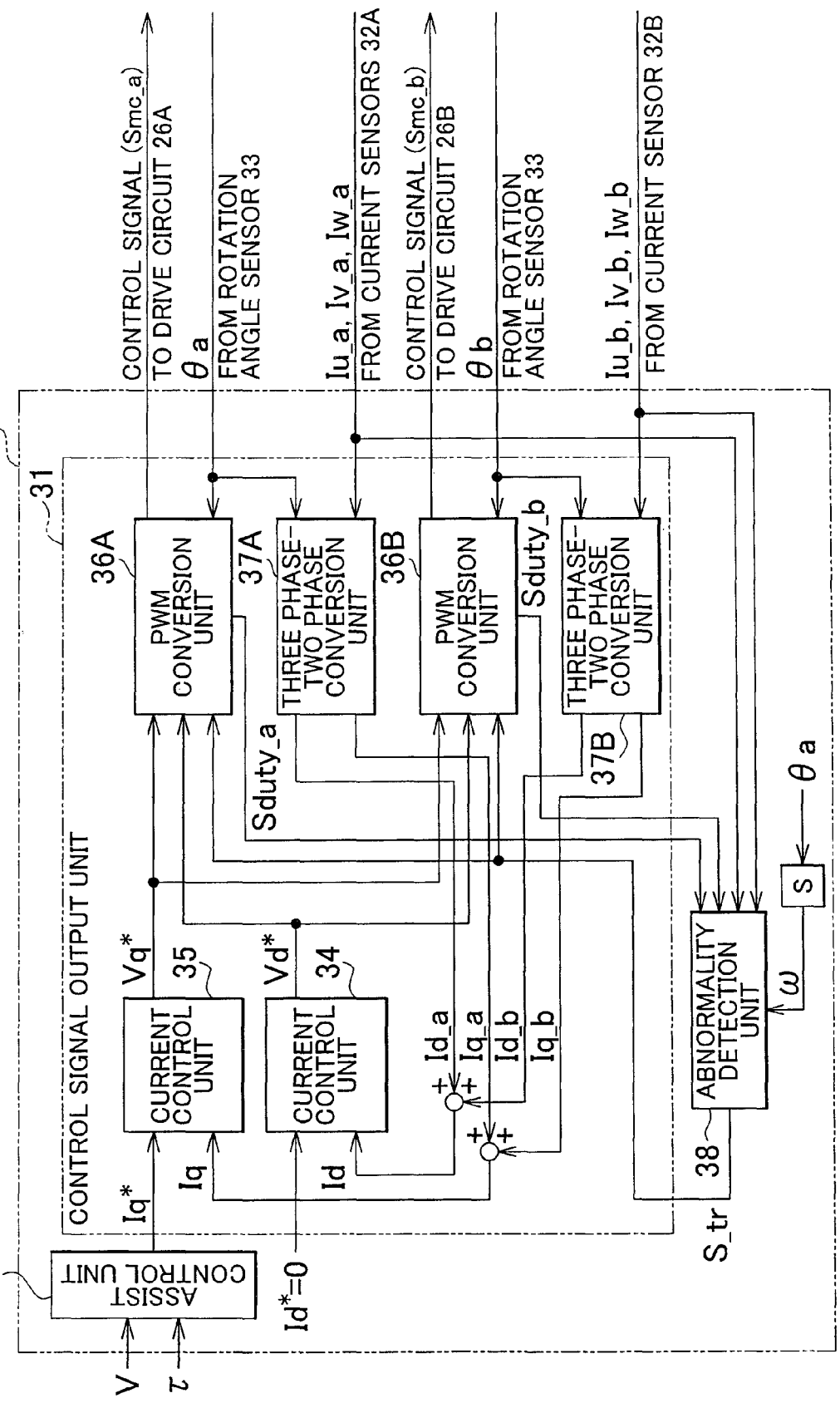
FIG. 4 is a control block diagram of the same EPS according to the first embodiment.

To describe this in further detail, as shown in FIG. 4, the microcomputer 27 according to the first embodiment includes an assist control unit 30 that generates a current command value Iq* relating to the power that is supplied to the motor 12 in order to generate motor torque corresponding to the target assist force, a control signal output unit 31 (control signal output means) that outputs the control signals Smc_a, Smc_b of the two systems on the basis of the current command value Iq*, and an abnormality detection unit 38 capable of detecting a conduction fault in a power supply path of each system.

In the first embodiment, the assist control unit 30, which serves as command means, calculates the current command value Iq* corresponding to the target assist force on the basis of the steering torque τ detected by the torque sensor 14 and the vehicle speed V detected by the vehicle speed sensor 15. More specifically, the assist control unit 30 calculates the current command value Iq* such that a steadily greater assist force is generated as the steering torque τ increases and the vehicle speed V decreases. The assist control unit 30 then outputs the current command value Iq* based on the steering torque τ and the vehicle speed V to the control signal output unit 31 as the current command value Iq* relating to the power supplied to the motor 12.

Meanwhile, as shown in FIG. 3, respective phase current values Iu_a, Iv_a, Iw_a and Iu_b, Iv_b, Iw_b that are passed through the motor coils 21A, 21B of the two systems shown in FIG. 2 and rotation angles θa, θb of the motor 12 are input into the control signal output unit 31, which serves as control signal output means. Note that in the first embodiment, the respective phase current values Iu_a, Iv_a, Iw_a and Iu_b, Iv_b, Iw_b are detected independently by current sensors 32A (32ua, 32va, 32wa), 32B (32ub, 32vb, 32wb) provided on the power lines 28A, 28B of the respective systems. The rotation angles θa, θb of the motor 12, on the other hand, are detected by a common rotation angle sensor 33. The motor rotation angle θb is calculated and determined on the basis of θa. The control signals Smc_a, Smc_b corresponding to the control signal drive circuits 26A, 26B according to the first embodiment are then output.

More specifically, as shown in FIG. 4, the control signal output unit 31 according to the first embodiment includes a PWM conversion unit 36A and a three phase-two phase conversion unit 37A corresponding to the first system (the system including the motor coil 21A shown in FIG. 2 and the drive circuit 26A and power line 28A shown in FIG. 3), and a PWM conversion unit 36B and a three phase-two phase conversion unit 37B corresponding to the second system (the system including the motor coil 21B shown in FIG. 2 and the drive circuit 26B and power line 28B shown in FIG. 3).

The respective phase current values Iu_a, Iv_a, Iw_a and Iu_b, Iv_b, Iw_b detected by the respective current sensors 32A, 32B and the motor rotation angles θa, θb detected by the motor rotation angle sensor 33 are input into the respective three phase-two phase conversion units 37A, 37B. The three phase-two phase conversion units 37 respectively convert the respective phase current values Iu_a, Iv_a, Iw_a and Iu_b, Iv_b, Iw_b into d axis current values Id_a, Id_b and q axis current values Iq_a, Iq_b of a d/q coordinate system on the basis of the input motor rotation angles θa, θb. The control signal output unit 31 then adds the d axis current value Id_a calculated by the three phase-two phase conversion unit 37A to the d axis current value Id_b calculated by the three phase-two phase conversion unit 37B, and outputs the result to a current control unit 34 as a d axis current value Id. Further, the microcomputer 27 adds the q axis current value Iq_a calculated by the three phase-two phase conversion unit 37A to the q axis current value Iq_b calculated by the three phase-two phase conversion unit 37B, and outputs the result to a current control unit 35 as a q axis current value Iq. The respective current control units 34, 35 then execute current feedback control on the basis of input control commands Id*, Iq*.

More specifically, the respective three phase-two phase conversion units 37A, 37B convert the respective phase current values Iu_a, Iv_a, Iw_a and Iu_b, Iv_b, Iw_b of the corresponding systems into d axis current values and q axis current values of a d/q coordinate system corresponding to the rotation angles θa, θb of the motor 12 (d/q conversion). Further, the control command Iq* is input as a q axis current command value (a d axis current command value is "0"). The respective current control units 34, 35 output a d axis voltage command value Vd* and a q axis voltage command value Vq* obtained by executing current feedback control in the d/q coordinate system. The respective PWM conversion units 36A, 36B calculate respective phase voltage command values Vu*_a, Vv*_a, Vw*_a and Vu*_b Vv*_b Vw*_b of the corresponding systems by mapping the input d axis voltage command value Vd* and q axis voltage command Vq* onto a three-phase alternating current coordinate system (d/q inversion). Then, on the basis of the respective phase voltage command values Vu*_a, Vv*_a, Vw*_a and Vu*_b, Vv*_b, Vw*_b of the corresponding systems, the control signals Smc_a, Smc_b are output to the drive circuits 26A, 26B of the corresponding systems.

Next, control of the EPS according to the first embodiment will be described. As shown in FIG. 4, the microcomputer 27 according to the first embodiment is provided with the abnormality detection unit 38, which is capable of detecting a conduction fault in the power supply paths of the respective systems corresponding to the motor coils 21A, 21B (see FIG. 2).

More specifically, the respective phase current values Iu_a, Iv_a, Iw_a and Iu_b, Iv_b, Iw_b passed through the motor coils 21A, 21B of the two systems, duty signals Sduty_a, Sduty_b indicating the ON duty of the respective phases, defined by the respective control signals Smc_a, Smc_b, and a rotation angular velocity ω of the motor 12 are input into the abnormality detection unit 38 according to the first embodiment. On the basis of these currents and signals, the abnormality detection unit 38, serving as detecting means, detects a conduction fault in the respective systems in relation to each phase.

More specifically, when a current value of a certain phase takes a value indicating a non-conductive condition even through the corresponding duty signal Sduty_a, Sduty_b indicates that the phase should be in a conductive condition, it may be determined that a conduction fault has occurred in the phase. A velocity condition based on the rotation angular velocity ω of the motor 12 is further added to the abnormality detection unit 38 according to the first embodiment. More specifically, the abnormality detection unit 38 is configured to be capable of detecting a conduction fault with a high degree of precision by not detecting an abnormality during high speed rotation, when an effect of a counter-electromotive voltage is great. In other words, the abnormality detection unit 38 only detects an abnormality when the rotation angular velocity ω of the motor 12 is equal to or lower than a predetermined velocity.

Furthermore, in the first embodiment, a result of the abnormality detection performed by the abnormality detection unit 38 is input into the control signal output unit 31 as an abnormality detection signal S_tr. When a conduction fault is detected in one of the two systems corresponding to the motor coils 21A, 21B, the control signal output unit 31 according to the first embodiment prioritizes control signal output to the drive circuit of the other system.

To describe this in further detail, with the control signal output unit 31 according to the first embodiment, when a conduction fault occurs in the first system, the control signal output unit 31 stops the power supply of the first system and prioritizes output of the control signal Smc_b to the drive circuit 26B of the second system corresponding to the motor coil 21B.

Further, with the control signal output unit 31 according to the first embodiment, when a conduction fault occurs in the second system, the control signal output unit 31 stops the power supply of the second system and prioritizes output of the control signal Smc_a to the drive circuit 26A of the first system. Furthermore, according to the first embodiment, when a conduction fault has not occurred, the control signal output unit 31 outputs the control signal Smc_a to the drive circuit 26A of the first system and outputs the control signal Smc_b to the drive circuit 26B of the second system (normal operation control).

A second embodiment of the EPS employing a two-system motor according to the invention will now be described with reference to the drawings. Only different constitutions to the first embodiment will be described below. Further, identical constitutional members have been allocated identical reference symbols, and detailed description thereof has not been repeated.

An electric constitution of an EPS 1 according to the second embodiment will now be described. As shown in FIG. 2, a motor 12 according to the second embodiment is formed by winding a first system motor coil 21A and a second system motor coil 21B of two independent systems around a single stator 22.

Figure 6:
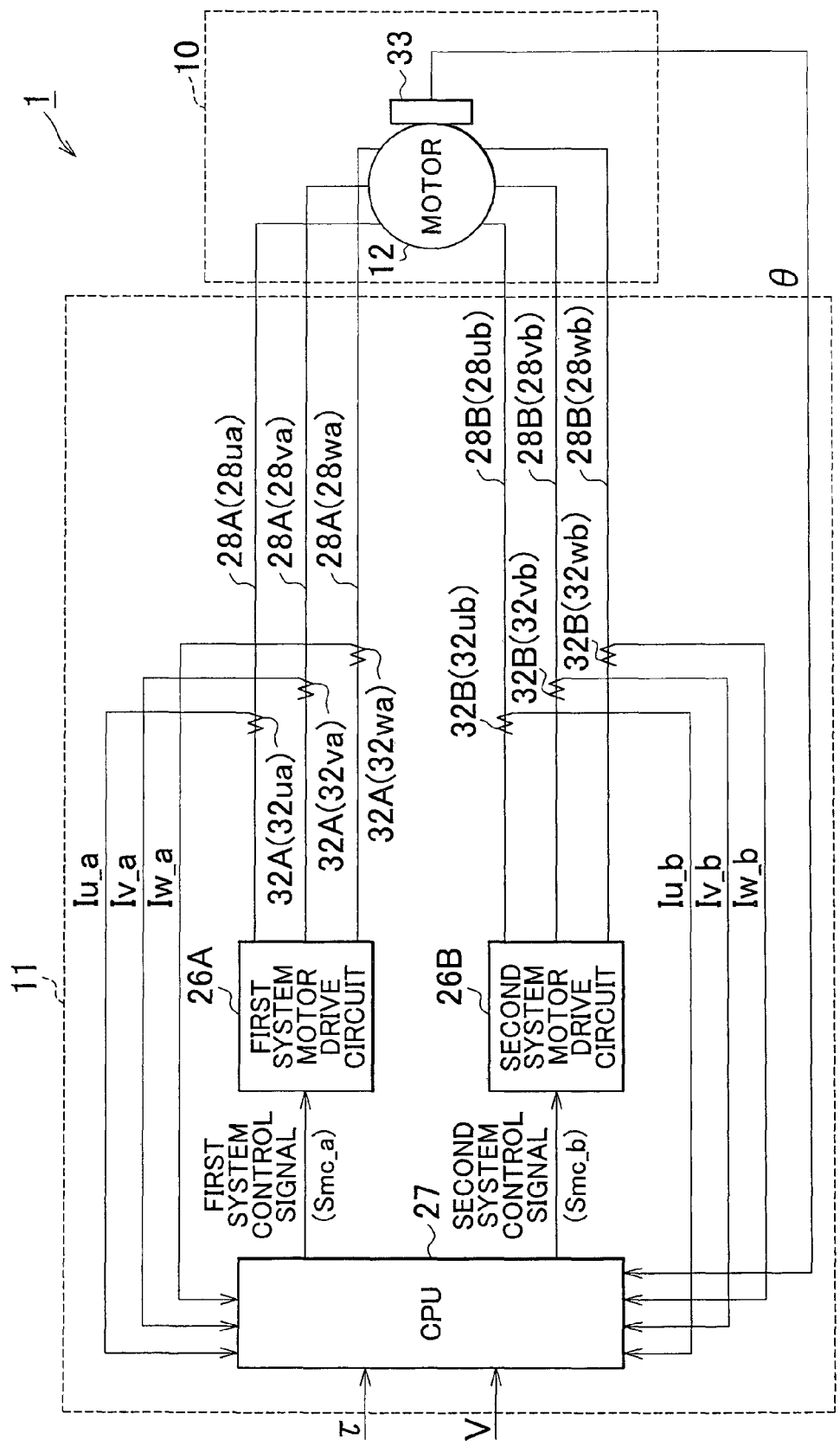
FIG. 6 is a control block diagram of an EPS according to the second embodiment.

As shown in FIG. 6, a motor rotation angle sensor 33 is connected to the ECU 11 according to the second embodiment in addition to a torque sensor 14 and a vehicle speed sensor 15. The ECU 11 detects a steering torque τ, a vehicle speed V, and a motor rotation angle θ on the basis of output signals from the respective sensors. The torque sensor 14 according to the second embodiment is, for example, a twin resolver type torque sensor in which a pair of resolvers are provided on either end of a torsion bar, not shown in the drawings. Further, the ECU 11 calculates the target assist force on the basis of the respective detected state quantities, and controls the operation of an EPS actuator 10, or in other words the assist force applied to the steering system, by supplying drive power to the motor 12.

Figure 5:
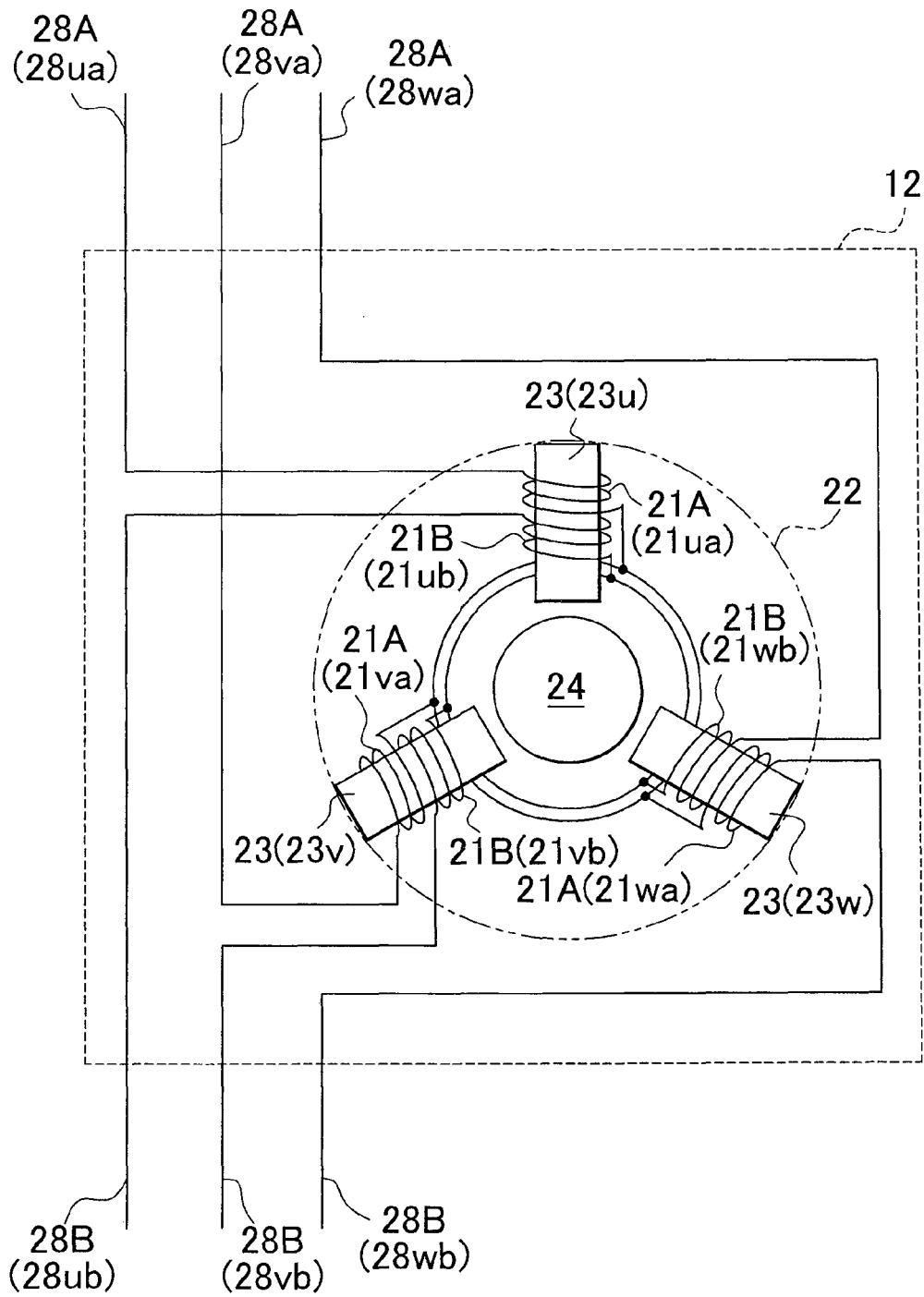
FIG. 5 is a schematic constitutional diagram of a motor according to a second embodiment.

As shown in FIG. 5, the first system motor coil 21A (21*ua*, 21*va*, 21*wa*) and the second system motor coil 21B (21*ub*, 21*vb*, 21*wb*) are respectively wound around teeth 23 (23*u*, 23*v*, 23*w*) of the stator 22 in respectively corresponding phases (U, V, W). A rotor 24 supported to be free to rotate is provided on the radial direction inner side of the teeth 23 (23*u*, 23*v*, 23*w*).

In other words, in the motor 12 according to the second embodiment, the first system motor coil 21A and the second system motor coil 21B of the two systems share the stator 22 and the rotor 24. The rotor 24 rotates on the basis of the magnetomotive force generated by the first system motor coil 21A and the second system motor coil 21B wound around the teeth 23 (23*u*, 23*v*, 23*w*) in the manner described above.

The ECU 11 according to the second embodiment is configured to control a motor torque by supplying drive power independently to the first system motor coil 21A and the second system motor coil 21B.

As shown in FIG. 6, the ECU 11 according to the second embodiment includes two motor drive circuits, namely a first system motor drive circuit 26A and a second system motor drive circuit 26B, provided independently with respect to the first system motor coil 21A and the second system motor coil 21B. Further, the ECU 11 includes a microcomputer 27 that serves as control means for outputting a first system control signal Smc_a and a second system control signal Smc_b independently to the first system motor drive circuit 26A and the second system motor drive circuit 26B.

More specifically, the first system motor drive circuit 26A is connected to the first system motor coil 21A via a first system power line 28A (28*ua*, 28*va*, 28*wa*), while the second system drive circuit 26B is connected to the second system motor coil 21B via a second system power line 28B (28*ub*, 28*vb*, 28*wb*).

Further, the first system control signal Smc_a output by the microcomputer 27 is input into the first system motor drive circuit 26A, while the second system control signal Smc_b is input into the second system drive circuit 26B.

Note that in the second embodiment, a conventional PWM inverter formed by connecting three arms corresponding to the respective phases in parallel, where a switching element pair connected in series is used as a basic unit (an arm), is employed as the first system motor drive circuit 26A and the second system motor drive circuit 26B. The first system control signal Smc_a and the second system control signal Smc_b output by the microcomputer 27 define an ON duty ratio of the arm of each phase.

The ECU 11 according to the second embodiment supplies drive power output by the first system motor drive circuit 26A and the second system motor drive circuit 26B independently to the respectively corresponding first system motor coil 21A and second system motor coil 21B on the basis of the first system control signal Smc_a and the second system control signal Smc_b.

Figure 7:
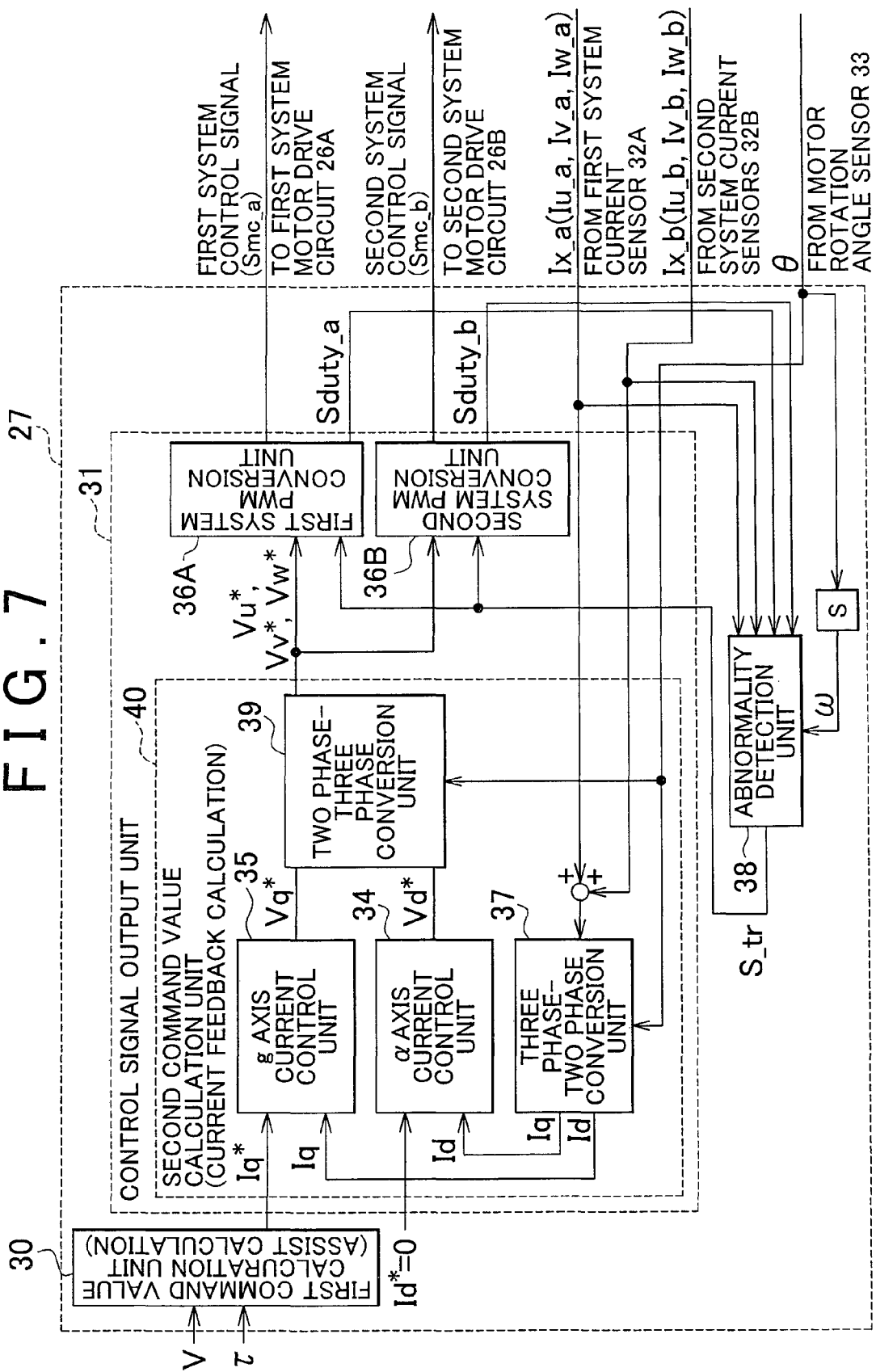
FIG. 7 is a control block diagram of the same EPS according to the second embodiment.

As shown in FIG. 7, the microcomputer 27 according to the second embodiment includes a first command value calculation unit (assist calculation) 30 that serves as first command value calculating means for generating a current command value Iq* relating to the power that is supplied to the motor 12 in order to generate the motor torque corresponding to the target assist force, a control signal output unit 31 that outputs the first system control signal Smc_a and the second system control signal Smc_b on the basis of the current command value Iq*, and an abnormality detection unit 38 capable of detecting a conduction fault in a power supply path of each system.

In the second embodiment, the first command value calculation unit (assist calculation) 30 calculates the current command value Iq* corresponding to the target assist force on the basis of the steering torque τ detected by the torque sensor 14 and the vehicle speed V detected by the vehicle speed sensor 15.

More specifically, the current command value Iq* is calculated such that a steadily greater assist force is generated as the steering torque τ increases and the vehicle speed V decreases. The first command value calculation unit (assist calculation) 30 then outputs the current command value Iq* based on the steering torque τ and the vehicle speed V to the control signal output unit 31 as the current command value Iq* relating to the power supplied to the motor 12.

Meanwhile, first system respective phase current values Iu_a, Iv_a, Iw_a and second system respective phase current values Iu_b, Iv_b, Iw_b that are passed respectively through the first system motor coil 21A and the second system motor coil 21B are input into the control signal output unit 31 together with the rotation angle θ of the motor 12 and an abnormality detection signal S_tr.

Note that in the second embodiment, the first system respective phase current values Iu_a, Iv_a, Iw_a and the second system respective phase current values Iu_b, Iv_b, Iw_b are detected independently by a first system current sensor 32A (32*ua*, 32*va*, 32*wa*) and a second system current sensor 32B (32*ub*, 32*vb*, 32*wb*) provided as current detecting means on the first system power line 28A and the second system power line 28B, respectively. The rotation angle θ of the motor 12, on the other hand, is detected by the common rotation angle sensor 33. Further, the abnormality detection signal S_tr is output from the abnormality detection unit 38.

The control signal output unit 31 includes a second command value calculation unit (current feedback calculation) 40 that serves as second command value calculating means for executing a current feedback calculation in a d/q coordinate system of a single system based on the current command value Iq* output from the first command value calculation unit (assist calculation) 30a, and difference between the first and second system respective phase current values, and a first system PWM conversion unit 36A serving as first system PWM converting means and a second system PWM conversion unit 36B serving as second system PWM converting means for PWM-converting respective phase voltage command values (control signals) output from the second command value calculation unit 40.

The first system respective phase current values Iu_a, Iv_a, Iw_a and the second system respective phase current values Iu_b, Iv_b, Iw_b passed respectively through the first system motor coil 21A and the second system motor coil 21B, and the rotation angle θ of the motor 12, are input into the second command value calculation unit (current feedback calculation) 40.

More specifically, a three phase-two phase conversion unit 37 converts added values of the first system respective phase current values Iu_a, Iv_a, Iw_a and the second system respective phase current values Iu_b, Iv_b, Iw_b of the corresponding systems into d axis current values and q axis current values of a d/q coordinate system corresponding to the rotation angle θ of the motor 12 (d/q conversion). Further, the control command Iq* is input as the q axis current command value (the d axis current command value is "0").

A d axis current control unit 34 and a q axis current control unit 35 output a d axis voltage command value Vd* and a q axis voltage command Vq* obtained by executing current feedback control in the d/q coordinate system. A two phase-three phase conversion unit 39 calculates respective phase voltage command values Vu*, Vv*, Vw* by mapping the input d axis voltage command value Vd* and q axis voltage command Vq* onto a three-phase alternating current coordinate system (d/q inversion).

The obtained respective phase voltage command values Vu*, Vv*, Vw* are then input into the first system PWM conversion unit 36A and second system PWM conversion unit 36B for performing a duty conversion. The first system PWM conversion unit 36A and the second system PWM conversion unit 36B then output the first system control signal Smc_a and the second system control signal Smc_b to the first system motor drive circuit 26A and the second system motor drive circuit 26B on the basis of duty converted values αu, αv, αw.

According to the embodiments described above, the following actions and effects can be obtained.

(a) In the motor according to the above embodiments, the stator and the rotor are shared between the motor coils of the two systems, and the motor coils are disposed at mutually offset phases. The rotor rotates on the basis of the magnetomotive force generated by the respective motor coils wound around the teeth in the manner described above. The control means (ECU) according to the above embodiments then controls the motor torque by supplying drive power to the respective motor coils. In other words, the ECU according to the above embodiments includes the two drive circuits provided in accordance with the respective motor coils, and the microcomputer that outputs the respective control signals to the drive circuits.

(b) Further, the control signal output unit outputs the control signals of the two systems by executing feedback control based on a deviation between the current command value generated by the command means and a current value obtained by adding together the current values that are obtained by converting the respective phase current values of the two systems, detected by the respective current sensors, into the d/q coordinate system. In other words, since the phases of the motor coils of the two systems are offset such that the current values of the respective phases cannot be added together, the control signal output unit according to the above embodiments adds together the current values converted into the d/q coordinate system.

(c) According to the constitutions described above, when the motor driving systems of the two systems are operative, the EPS can lighten the calculation load of the microcomputer by performing feedback control by adding together the current values detected in the respective motor driving systems. Further, since the calculation load of the microcomputer is lightened, the EPS can drive the motor synchronously using a single microcomputer.

(d) Further, the ECU includes the abnormality detecting means capable of detecting a conduction fault in the power supply paths of the respective systems corresponding to the respective motor coils. When a conduction fault is detected in one of the systems executing assist control, the control signal output unit opens the three phases of the motor coil in the system where the conduction fault has occurred and continues the assist control by outputting the control signal in the other, normal system.

According to the EPS constituted as described above, a torque ripple does not occur during continued control following the occurrence of a conduction fault, and therefore steering can be continued with favorable steering responsiveness.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less, or only a single element, are also within the scope of the appended claims.

In the above embodiments, the invention is realized as the column assist type EPS 1. However, the invention may also be applied to a pinion assist type EPS or a rack assist type EPS.

In the first embodiment, the EPS actuator 10 uses the motor 12, in which the shared stator 22 and rotor 24 are provided for the motor coils 21A, 21B of the two systems, as a drive source. The invention is not limited thereto, however, and may be realized in a configuration where individual stators and individual rotors are provided for the respective motor coils.

Moreover, the invention may be applied to an apparatus that uses two motors as drive sources. Furthermore, a plurality of systems including three or more motor coils may be provided.

Further, in the first embodiment, the motor coils of the respective systems are disposed such that the phases thereof are offset from each other, but the motor coils may wound around identical teeth so as to be in-phase.

In the second embodiment, the second command value calculation unit outputs the respective phase voltage command values Vu*. Vv*, Vw* to the first and second system PWM conversion units by executing the d/q coordinate system current feedback control a single time. The invention is not limited thereto, however, and ½ of the respective phase voltage command values Vu*, Vv*, Vw* may be output respectively to the first and second system PWM conversion units.

Furthermore, in the above embodiments, the invention may be realized as a motor control system for controlling a motor including independently provided motor coils of two systems, instead of an EPS.

The invention claimed is:

1. An electric power steering apparatus including a motor that applies a steering assist force to a steering mechanism, and a plurality of motor driving systems respectively constituted by drive circuits for driving the motor, the electric power steering apparatus comprising:
    a steering torque detector configured to detect a steering torque;
    a vehicle speed detector configured to detect a vehicle speed;
    a first command value calculating unit configured to calculate a first command value on the basis of the steering torque and the vehicle speed;
    a current detector provided in each of the motor driving systems to detect a concurrent current flowing through the motor from each of the motor driving systems;
    a motor driving system current adding unit configured to add together the concurrent currents of the respective motor driving systems detected by the current detectors;
    a second command value calculating unit configured to calculate a second command value on the basis of the first command value and the currents added by the motor driving system current adding unit; and
    a command output unit configured to output the second command value to the plurality of motor driving systems as a motor control command.

2. The electric power steering apparatus according to claim 1, further comprising an abnormality detector configured to detect an abnormality in the electric power steering apparatus,
    wherein, when an abnormality occurs in a motor coil of one of the plurality of motor driving systems or in one of the motor drive circuits, the abnormality detector is configured to output the second command value to the PWM converting unit of any of the motor driving systems in which the abnormality has not occurred.

3. The electric power steering apparatus according to claim 2, wherein the abnormality detector is configured to detect an abnormality only when a rotation angular velocity of the motor is equal to or smaller than a predetermined velocity.

4. An electric power steering apparatus including a motor that applies a steering assist force to a steering mechanism, and a plurality of motor driving systems respectively constituted by drive circuits for driving the motor, comprising:
    a steering torque detector configured to detect a steering torque;
    a vehicle speed detector configured to detect a vehicle speed;
    a first command value calculating unit configured to calculate a first command value on the basis of the steering torque and the vehicle speed;
    a current detector provided in each of the motor driving systems to detect a concurrent current flowing through the motor from each of the motor driving systems;
    a second command value calculating unit configured to (i) add together the concurrent currents of the respective motor drive systems detected by the current detectors, and (ii) calculate a second command value by performing a d/q coordinate system current feedback calculation using the added together concurrent currents; and
    a plurality of PWM converting units configured to output the second command value respectively to the plurality of motor drive systems.

5. The electric power steering apparatus according to claim 4, further comprising a rotation angle detector configured to detect a rotation angle of the motor,
    wherein the first command value calculating unit is configured to calculate the first command value on the basis of the steering torque, the vehicle speed, and the motor rotation angle.

6. The electric power steering apparatus according to claim 4, further comprising an abnormality detector configured to detect an abnormality in the electric power steering apparatus,
    wherein, when an abnormality occurs in the motor of one of the plurality of motor driving systems or in one of the motor drive circuits, the abnormality detector is configured to output the second command value to the PWM converting unit of any of the motor driving systems in which the abnormality has not occurred.

7. The electric power steering apparatus according to claim 6, wherein the abnormality detector is configured to detect an abnormality only when a rotation angular velocity of the motor is equal to or smaller than a predetermined velocity.

* * * * *